US009059971B2

(12) United States Patent
Graham et al.

(10) Patent No.: US 9,059,971 B2
(45) Date of Patent: Jun. 16, 2015

(54) SYSTEMS AND METHODS FOR SECURE VOICE COMMUNICATIONS

(75) Inventors: Andrew Graham, North Aurora, IL (US); Michael Kopec, Warminster, PA (US)

(73) Assignee: KOOLSPAN, INC., Bethesda, MD (US)

( * ) Notice: Subject to any disclaimer, the term of this patent is extended or adjusted under 35 U.S.C. 154(b) by 316 days.

(21) Appl. No.: 13/044,590

(22) Filed: Mar. 10, 2011

(65) Prior Publication Data
US 2011/0222688 A1    Sep. 15, 2011

Related U.S. Application Data

(60) Provisional application No. 61/312,279, filed on Mar. 10, 2010.

(51) Int. Cl.
*H04L 29/06* (2006.01)
*H04W 12/02* (2009.01)

(52) U.S. Cl.
CPC ........... *H04L 63/0428* (2013.01); *H04L 63/164* (2013.01); *H04W 12/02* (2013.01)

(58) Field of Classification Search
CPC .. H04L 63/0428; H04L 63/164; H04W 12/02
USPC ................................................. 380/247–250
See application file for complete search history.

(56) References Cited

U.S. PATENT DOCUMENTS 5,835,724 A * 11/1998 Smith ........................... 709/227
7,430,665 B2    9/2008 DiSanto et al.
8,583,912 B2 * 11/2013 Ishikawa et al. ............... 713/151
8,676,934 B2 *  3/2014 Takakura ...................... 709/219
2003/0061493 A1    3/2003 Angelo et al.
2003/0128696 A1 *  7/2003 Wengrovitz et al. ......... 370/352

(Continued)

FOREIGN PATENT DOCUMENTS

CN          101384042     3/2009
EP          0957651       9/2000

(Continued)

OTHER PUBLICATIONS

Nicolas Hohn & Darryl Veitch, "Inverting Sampled Traffic", IMC '03, Oct. 27-29, 2003, Miami Beach, Florida, USA; ACM 1-58113-773-7/03/0010; pp. 222-233.*

(Continued)

*Primary Examiner* — Yin-Chen Shaw
*Assistant Examiner* — Carlos Amorin
(74) *Attorney, Agent, or Firm* — Hunton & Williams LLP

(57) ABSTRACT

A secure voice solution for a PDA-type device is provided. Voice data is received from the user using the device microphone and built-in media player software in the device. This data is encrypted and sent as an IP packet. The device then receives, as IP packets, encrypted voice communication from the other party in the encrypted call, which in turn are decrypted in the device and played back on a second media player running on the device. The present invention takes advantage of the device's ability to run two media players simultaneously to in effect, simulate a cellular telephone call. As a result, an encrypted call can be made with PDA-type devices such as the Blackberry® and also such calls can be made using different data paths (cellular, WiFi, Bluetooth) as the calls are made by sending and receiving data over the Internet, not as traditional cellular data signals.

23 Claims, 9 Drawing Sheets

(56) References Cited

U.S. PATENT DOCUMENTS

| | | | |
|---|---|---|---|
| 2005/0033852 A1* | 2/2005 | Tenhunen | 709/229 |
| 2006/0045068 A1* | 3/2006 | Wu et al. | 370/352 |
| 2006/0090074 A1* | 4/2006 | Matoba | 713/171 |
| 2006/0158310 A1* | 7/2006 | Klatsmanyi et al. | 340/10.1 |
| 2006/0256771 A1* | 11/2006 | Yarlagadda | 370/352 |
| 2007/0162385 A1* | 7/2007 | Suzuki et al. | 705/39 |
| 2007/0162386 A1* | 7/2007 | Suzuki et al. | 705/39 |
| 2007/0192818 A1* | 8/2007 | Bourges-Sevenier et al. | 725/132 |
| 2008/0222301 A1* | 9/2008 | Takeuchi et al. | 709/231 |
| 2009/0015659 A1* | 1/2009 | Choi | 348/14.09 |
| 2009/0122984 A1 | 5/2009 | Fascenda et al. | |
| 2009/0327703 A1* | 12/2009 | Feudo et al. | 713/156 |
| 2010/0067430 A1* | 3/2010 | Shinozaki | 370/315 |
| 2010/0167821 A1* | 7/2010 | Tamura | 463/42 |
| 2010/0205279 A1* | 8/2010 | Takakura | 709/219 |
| 2011/0004655 A1* | 1/2011 | Okita | 709/203 |
| 2011/0170447 A1* | 7/2011 | Kampmann et al. | 370/252 |
| 2011/0199899 A1* | 8/2011 | Lemaire et al. | 370/230.1 |
| 2011/0209196 A1* | 8/2011 | Kennedy | 726/1 |
| 2012/0005365 A1* | 1/2012 | Ma et al. | 709/231 |
| 2012/0015602 A1* | 1/2012 | Murakami et al. | 455/7 |
| 2012/0057684 A1* | 3/2012 | Brahm et al. | 379/93.23 |
| 2012/0148035 A1* | 6/2012 | Katis et al. | 379/88.14 |
| 2012/0150424 A1* | 6/2012 | Chavez et al. | 701/118 |
| 2014/0143387 A1* | 5/2014 | Takakura | 709/219 |

FOREIGN PATENT DOCUMENTS

| | | |
|---|---|---|
| EP | 1376924 | 1/2007 |
| KR | 10-2002-0032519 | 5/2002 |
| KR | 10-2007-0027021 | 3/2007 |
| WO | WO/2006/0567627 | 1/2006 |
| WO | WO/2007/120006 | 10/2007 |
| WO | WO/2008/015448 | 2/2008 |

OTHER PUBLICATIONS

D. Richard Kuhn, et al., Security Considerations for Voice Over IP Systems, Special Publication 800-58, Jan. 2005.

* cited by examiner

SYSTEMS AND METHODS FOR SECURE VOICE COMMUNICATIONS

CROSS-REFERENCE TO RELATED APPLICATIONS

The present application claims priority from Provisional U.S. patent application Ser. No. 61/312,279 filed on Mar. 10, 2010, and incorporated herein by reference.

FIELD OF THE INVENTION

The present invention relates to cellular telephones and personal digital assistants. In particular, the present invention is directed toward a voice encryption system for the Blackberry® PDA cell phone device.

BACKGROUND OF THE INVENTION

Fascenda, Published U.S. Patent Application Nos. US 2009169013, US 2009172412, US2009268902, assigned to KOOLSPAN, INC. (Hereinafter referred to as the KOOLSPAN patent applications) and incorporated herein by reference, disclose a system for and method of providing end-to-end encrypted real-time phone calls using a commodity mobile phone and without requiring service provider cooperation. The system and method improve upon prior art techniques by omitting any requirement for mobile phones that are specially manufactured to include end-to-end encryption functionality.

The KOOLSPAN patent applications generally relate to a system for and method of secure telephony. More particularly, they relate to a system for and method of receiving and making encrypted phone calls to and from, respectively, a mobile phone. In the KOOLSPAN Applications, key tables may be stored in one or both of the commodity mobile phone and the integrated circuit with which the commodity mobile phone is provisioned. The key tables may be delivered to or generated by the mobile phone, or may be present on the integrated circuit when the integrated circuit is acquired. For delivered key tables, managed providers or enterprises may monitor and track the delivery of the key tables.

The initial authentication step, includes the commodity mobile phone transmitting to the destination phone a list of IDs for key tables that the commodity mobile phone has access to. Upon receiving the list of key table IDs, the destination phone selects from the list an ID of a key table to which the destination phone also has access. At this point, the commodity mobile phone and the destination phone both have possession of at least one session key as a result of the authentication process. The phones then use the session key(s), either directly or as a basis for other keys, to encrypt and decrypt voice communications sent and received over the selected communications channel (e.g., CSD, voice, etc.). The actual encryption and decryption operations may be performed by a dedicated cryptographic processor present in the integrated circuit that the commodity mobile phone is provisioned with, by software executing on the phone, or by using other techniques. For GSM phones and in certain embodiments, all data existing between the respective phones' Adaptive Multi-Rate ("AMR") codecs may be encrypted using the session key(s), thereby providing for end-to-end encrypted phone calls.

The technique disclosed in the KOOLSPAN patents encrypts data in a regular GSM type cellular telephone call. While this may work for some types of cellular telephones, it may not be workable for other devices, including cellular devices that are combined with Personal Digital Assistants (PDAs) and/or other communications type devices (text messaging, internet access, or the like).

It's estimated that more than 12 million BlackBerry devices are currently in use in government and commercial environments. While these tools greatly enhance productivity and convenience, they can also expose organizations to serious risks if not properly secured. Though secure phone solutions exist, they have traditionally been expensive, difficult to acquire and cumbersome to maintain and operate. Many are also easily distinguishable as secure phones, which compromises operational security and exposes their users.

However, to date, an effective technique for applying the technology of the KOOLSPAN patent applications to the Blackberry mobile device has not been implemented. Thus, it remains a requirement in the art to provide a technique for providing voice encryption for use with a Blackberry type PDA/cellular device.

VoIP solutions are known in the art for use with computer systems, including laptops and PCs and the like. Vonage, Skype and other systems allow users to send and receive phone calls using personal computers such as laptops or desktop PCs. Skype has implemented VoIP type communications for cell phones, but does not provide voice encryption for such applications.

SUMMARY OF THE INVENTION

The present invention provides a secure voice solution for the BlackBerry 9000 (BlackBerry Bold™) and other PDA type devices, that is discreet, easy-to-use and cost-effective. Currently supported/tested devices include BlackBerry 8900, 9000, and 9700 models, including GSM-based BlackBerry models with a 4.6 operating system and above. One Vault Voice™ is a combination of hardware and software that work together to create a fully hardened, self-contained secure communication environment. By integrating a proprietary communication application with a hardened encryption module—TrustChip®—One Vault Voice offers a differentiating cyber security solution that enables users to have seamless voice protection whenever and wherever they need to place a sensitive call.

Rather than making encrypted voice calls through traditional GSM cellular phone calls, the present invention instead receives voice data from the user using the device microphone (built-in microphone, headset microphone, or even a Bluetooth wireless headset) and built-in media player software in the device. This data is then encrypted and then sent as an UDP/IP packet. The device then receives, as IP packets, encrypted voice communication from the other party in the encrypted call, which in turn are decrypted in the device and then played back via a second media player running on the device. The present invention takes advantage of the device's ability to run two media players simultaneously to in effect, simulate a cellular telephone call. As a result, an encrypted call can be made with PDA-type devices such as the Blackberry® and also such calls can be made using different data paths (cellular, WiFi, Bluetooth, or the like) as the calls are made by sending and receiving data over the Internet, not as traditional cellular data signals. Alternately, an extension to the application may allow a user to run secure calls in a 'sandboxed' network. An isolated network, not connected to the internet, could be used as a transport. For example, a Wifi network aboard a sailing vessel could be used to transmit secure calls between users.

The present invention may utilize the encryption technology employed by KOOLSPAN as used in their Trust Chips and as discussed previously. However the KOOLSPAN technology is employed only as an "off the shelf" (OTS) solution for the encryption portion of the invention, and other types of encryption may be used within the spirit and scope of the invention. In an alternative embodiment, a software-only encryption method may be used as an alternative to hardware encryption, as an option where or when hardware encryption is not available. The disclosure of the KoolSpan technology in the present application is provided to comply with the "best mode" requirement, illustrating the best mode contemplated at the time of filing of the present application.

As a result, the present invention can be deployed and managed quickly and seamlessly without the need for advanced training, additional handsets or new service plans. One Vault Voice also costs less than other options and it can be easily removed and reinstalled into another Blackberry, as needed, making it extremely portable and convenient.

As stated, the present invention uses multiple media players to simulate a duplex voice call. Current BlackBerry Application Programming Interfaces (APIs) do not provide a mechanism for reducing audio playback buffering. The built-in buffering, likely built for internet media streaming, would introduce excessive conversational latency. The present invention uses multiple operating system dependent methods to reduce playback lag to limit delay.

Cellular data protocols can introduce variable data latency, which can negatively impact voice communications. The adaptive audio buffer controls both the sending and receiving portion of the application. In this way the application can proactively modify the buffering and data packet sizes to provide the best overall voice experience for current network conditions. Mechanisms are employed to reduce gaps in conversation and balance that against introducing latency.

The One Vault Voice system has a number of advantages over the Prior Art. It is discreet and highly portable and costs less than traditional secure voice solutions. It is easy to use, and it is also easily scalable and rapidly deployable. In addition, the One Vault Voice system provides enhanced security over the Prior Art by combining its unique implementation and buffering with the use of the KOOLSPAN encryption hardware and technology. It provides simplified security for both users and IT and is highly scalable.

Once One Vault Voice is installed, all a user needs to do to place a secure call is select the contact (i.e. the person he/she wants to call) via the BlackBerry address book, and select the "Place Secure Call". One Vault Voice does the rest. The One Vault Voice system of the present invention initiates the call by sending an SMS or PIN message to the Blackberry device of the call recipient. In an alternative embodiment, 'automatic' call forwarding is enabled, where the phone is programmed not to accept voice calls while a secure call is in progress. After the secure call ends, the call forwarding is deactivated. Depending upon data path (cell, WiFi, or the like) and the available contact information (Phone Number, BlackBerry PIN), a SMS or PIN message is selected. Unlike Prior Art systems, which use cellular connections only and SMS messages to initiate calls, initial communication in the present invention between devices may take place using SMS, PIN or other types of messages to initiate the call.

Securing voice communications through One Vault Voice helps prevent costly and irreversible disclosure of sensitive information through eavesdropping on a non-secure commercial network. With One Vault Voice, end-to-end security for transmitted data is not only maintained between the wireless handset and the nearest cellular tower, but it is also secured while the data traverses the carrier's network. One Vault Voice, in conjunction with the KoolSpan API, also provides the capability of conclusively authenticating all parties, prior to establishing the call, without relying on a carrier-based caller ID. The KoolSpan API provides a security authentication string which may be read by participants to verify that the call has not been intercepted.

One Vault Voice can be installed in most client environments in one day. In a typical scenario, deployment consists of installation and configuration of a configurable One Vault Voice Relay Server, over the air client code installation, and optional installation and configuration of the TrustChip management platform, the TrustCenter. The One Vault Voice Relay Server is responsible for connecting handsets across various networks by providing a single IP location for all data transmissions. TrustCenter provides the user with complete control, including easy-to-configure access control and enhanced security capabilities for the TrustChip portion of the One Vault Voice solution. The system provides organizations with a secure operational capability while minimizing cost and risk. Client application installation can be done via the TrustChip, over the air by the user, or remotely by a BlackBerry Enterprise Server Administrator.

In the preferred embodiment, the present invention utilizes the TrustChip manufactured by KoolSpan as an off-the-shelf (OTS) solution for providing encryption of data transmitted through the system. However, the present invention utilizes the TrustChip in a manner different from that presently employed by KoolSpan. Other types of encryption chips or solutions may be applied within the spirit and scope of the present invention, including but not limited to, those provided by CellCrypt, SecurDigital, and GoldLock or the like.

In a process known as Smart Data Thinning, when data accumulates in a buffer above a threshold, the entire buffer is thinned, dropping intermittent small portions of the audio data. The remaining audio data remains comprehensible when presented to the user. Multiple thresholds are defined and thinning becomes more aggressive as needed. Aggressively thinned audio may become incomprehensible but when presented to the user, it lets them know there is still a connection.

In addition, the present invention employs a technique known as Performance Dependant Variable Packet Size. Under optimal conditions, small package size and correlating small optimization buffers should result in lowest call latency. However, processing many smaller packets increases the load on the mobile device and can negatively affect the frequency of which audio data from the hardware is delivered to the transport system. Processing many smaller packets is also more demanding of the network components. To avoid these problems, data is analyzed from performance metrics (delivery frequency and buffer accumulation) and data package sizes are adjusted accordingly—i.e., lower performance result in large package sizes.

The present invention solves the problems of the Prior Art and allows secure encrypted voice signals to be sent as audio data packets over an Internet connection in a Blackberry type device through the use of dual media players and optimized buffering.

DETAILED DESCRIPTION OF THE INVENTION

Figure 1:
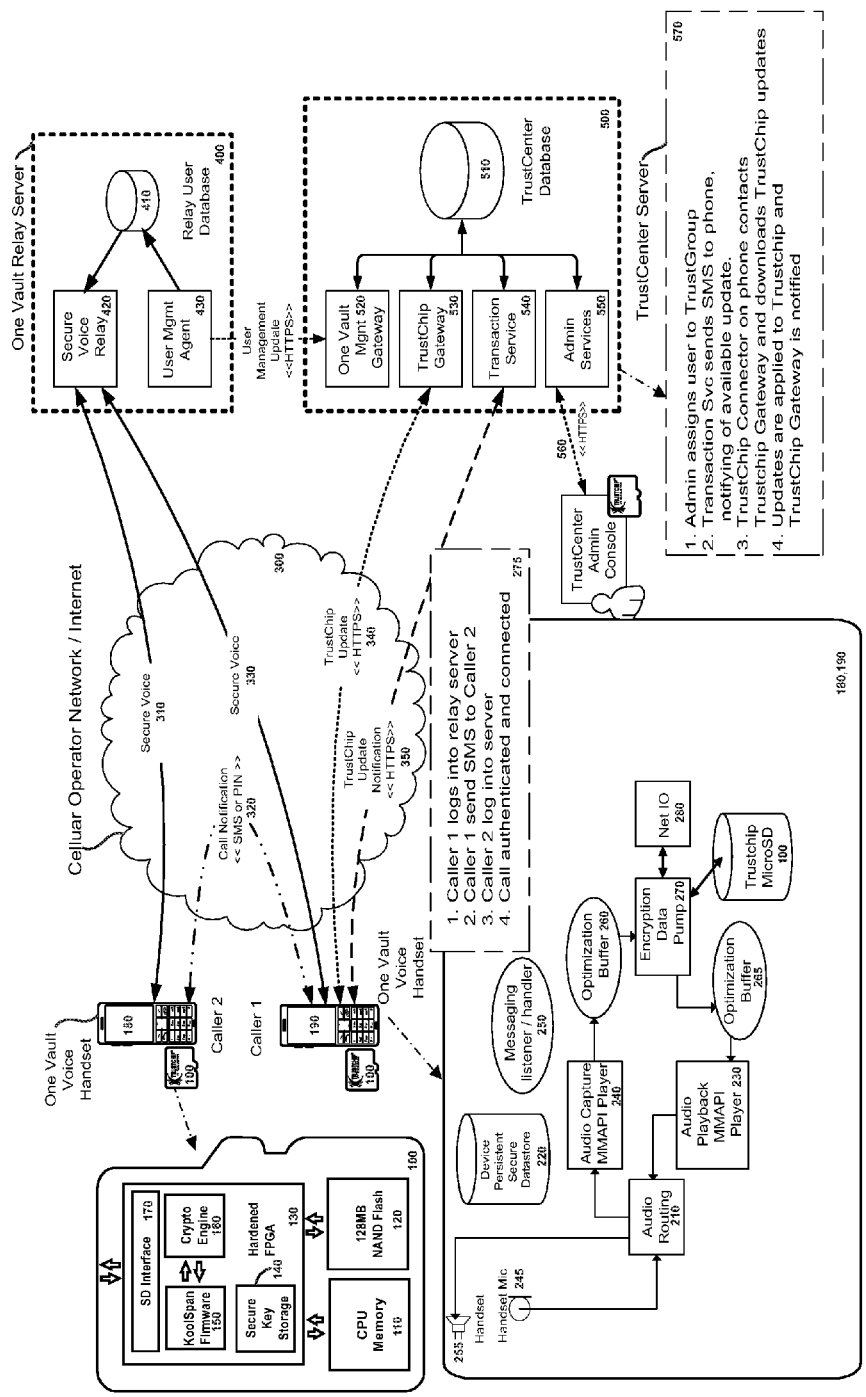
FIG. 1 is a block diagram of the overall system of the present invention.

FIG. 1 is a block diagram of the overall system of the present invention. Referring to FIG. 1, there are several major components of the One Vault Voice system of the present invention, each of which will be described in more detail below. Encryption device 100 may comprise a KoolSpan TrustChip manufactured by KoolSpan, Inc. of Bethesda Md.

Figure 7:
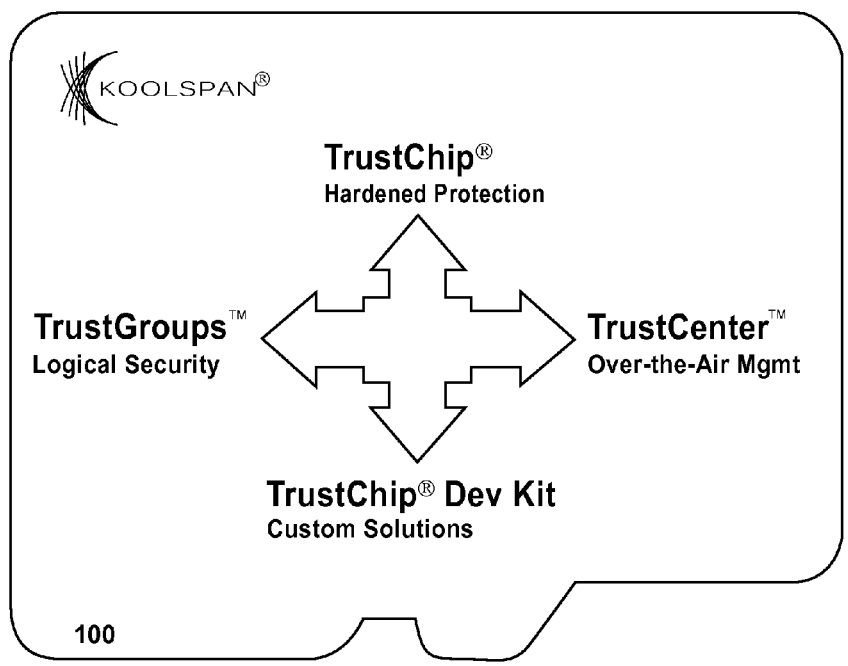
FIG. 7 is a diagram illustrating the major features of the trust chip solution of the Prior Art.
Figure 8:
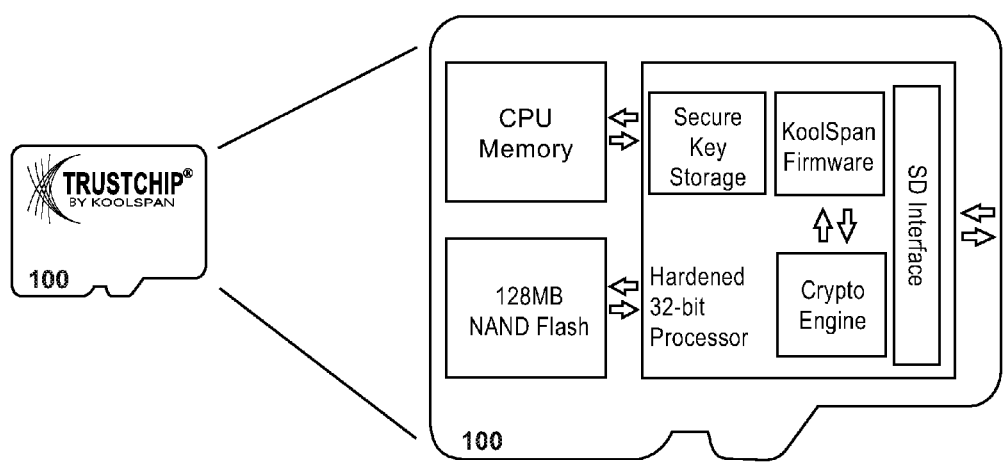
FIG. 8 is a diagram illustrating the major components of the trust chip of the Prior Art.
Figure 9:
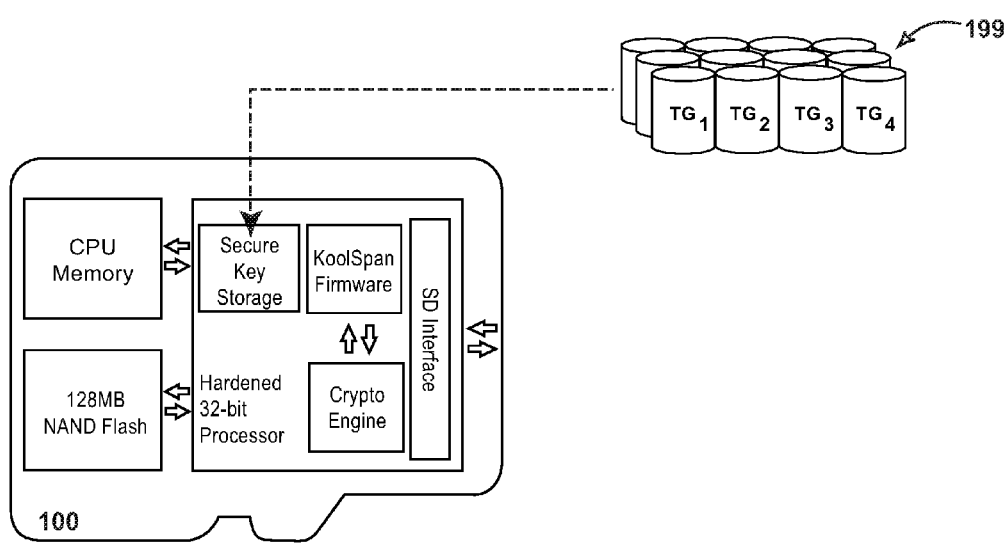
FIG. 9 is a diagram illustrating how keys may be stored in the trust chip.

FIG. 7 is a diagram illustrating the major features of the trust chip solution. FIG. 8 is a diagram illustrating the major components of the trust chip. FIG. 9 is a diagram illustrating how keys may be stored in the trust chip. Referring to FIGS. 1 and 8, encryption/decryption device 100 may comprise a TrustChip, which is a silicon-based design supporting KoolSpan's security architecture for wired and wireless networks. Easy to implement, there are no Public Key Infrastructure (PKI) certificate servers to deploy, configure or maintain. encryption/decryption device 100 may be provided with standard SD Card/USB interfaces 170 and is provided with a hardened, tamper-resistant, tamper-evident package 130. Each Trust Chip 100 is provided with a unique, secret serial number stored in flash memory 120. An internal 32-bit processor 110 generates and handles keys. The device supports multiple security associations, network connections and applications and is provided with bi-directional authentication. FIPS certified algorithms stored in firmware 150 are used to generate keys stored in secure memory area 140. Customizable firmware 150 may be provided for specific OEM applications. Once keys are generated, crypto engine 160 may encrypt data received and sent through secure interface 170.

Referring to FIG. 9, keys 199 may be stored in secure key storage 140. Keys 199 may comprise a collection of random 256-bit keys and may be common to members of a TrustGroup as will be discussed in more detail below. Keys 199 are used for authentication purposes but are not used for encryption of audio data. Keys 199 may be used in a hardware computation to generate a unique session key, as is known in the art. Dozens of such keys 199 may be loaded into a trust chip 100. Keys 199 are not exposed to the end user and are protected by tamper-proof hardware.

Handsets 180,190 are illustrated in FIG. 1 as being provided with TrustChips 100, respectively. TrustChips 100 is described above and as shown in FIG. 8. The operation of handsets 180,190 is illustrated in detail 200. In a traditional cell phone call, voice is input through the handset microphone 245 and sent to another cell phone through traditional telephony channels. Received voice signals from another handset are played back through a handset speaker 255. In the present invention, voice input into the device through handset microphone 245 (or headset microphone, Bluetooth microphone, or the like) is routed 210 to an audio player (Mobile Media API) 240 which converts the voice signals to a media player data format which is then transmitted to the receiving phone in a similar manner to an MP3 tune, video, or other media file. Received data from another device may be converted back to audio signals in a second Mobile Media API Audio Player 230, which in turn may be routed 210 to handset speaker 255 (or headset speaker or Bluetooth speaker or the like). Thus, instead of sending the voice signals as traditional cell phone calls, in the present invention, two media players may be run simultaneously to emulate a cell phone call by sending and receiving the voice communications as media player data.

Output data may be sent through an optimization buffer 260 and received data received through a similar buffer 265. With traditional media files (e.g., MP3 music files, video files, or the like) a relatively large amount of buffering may actually be desired, so that playback is not interrupted by delays in the network connections and the like. However, when trying to use media pathways in a telephony application, such buffering can create delays, which are unacceptable for normal conversations. The present invention includes a technique for managing the buffers and network packets to reduce the amount of data in the buffer and optimize the quality of the conversation by balancing latency and smooth audio playback.

When using the media player to send and receive voice data, the application should prevent the media player from buffering too much data, which would introduce audio delays in the calls. To achieve this effect, the present invention employs two techniques to prevent audio delays. First, as previously discussed, are the techniques used running a custom media player Data Source to limit initial playback delay to acceptable levels. Second is a packet and audio buffer optimization that keeps the audio as 'smooth' as possible when dealing with network and device resource inconsistencies. The optimization buffer(s) 260,265 balance the various audio quality aspects to provide the best overall user experience under inconsistent network and host device performance conditions for an encrypted mobile VoIP system.

Mobile network data stream inconsistencies and device performance constraints, such as Dropped/lost data, Out of order data, Inconsistent frequencies of data delivery due to variable delivery times (network latency), Mobile Device Performance Limitations and the like may create variable timing delays. The rate at which audio data is made available and consumed by mobile device can vary as the overall load on the devices changes resulting in inconsistent frequency of data delivery and consumption.

The present invention solves this problem by implementing specialized jitter buffers located in the send and receive handlers 250 to balance smart data thinning against latency and implement performance dependant variable packet size to adjust package size to available resources.

In a process known as Smart Data Thinning, when data accumulates in a buffer 260,265 above a threshold, the entire buffer 260,265 is thinned, dropping intermittent small portions of the audio data. The remaining audio data remains comprehensible when presented to the user. Multiple thresholds are defined and thinning becomes more aggressive as needed. Aggressively thinned audio may become incomprehensible but when presented to the user, it lets them know there is still a connection.

In addition, the present invention employs a technique known as Performance Dependant Variable Packet Size. Under optimal conditions, small package size and correlating small optimization buffers would result in the best overall quality. However, processing many smaller packets increases the load on the mobile device and can negatively affect the frequency of which audio data from the hardware is delivered to the transport system. Processing many smaller packets is also more demanding of the network components. To avoid these problems, data is analyzed from performance metrics (delivery frequency and buffer acclamation) and data package sizes are adjusted accordingly—i.e., lower performance result in large package sizes.

Data sent to and from the handset 180,190 is then sent through encryption data pump 270, which in turn interfaces with the TrustChip 100 as discussed above. The TrustChip encrypts and decrypts the voice data packets, which are then sent (or received from) the network through network interface 280.

A device persistent secure data store 220 may be provided to store secure data, such as data keys and the like, in a secure manner. Relay server credentials are one important component stored in the persistent store. These credentials are protected by operating system access controls. Message listener/handler 250 may handle messages used to initiate a call. As illustrated in block 275, a call may be initiated when a first caller on device 190 logs into a relay server 400 (discussed below) and sends an SMS message to a second caller on device 180. The second caller receives the SMS message, is prompted to answer the call, and if they choose to answer, the application then logs into the relay server 400. After both parties have authenticated with the relay server, the encryption negotiation begins. Once encryption negotiation is complete, the call is connected and encrypted voice data is sent and received as media packets as previously discussed.

Figure 2:
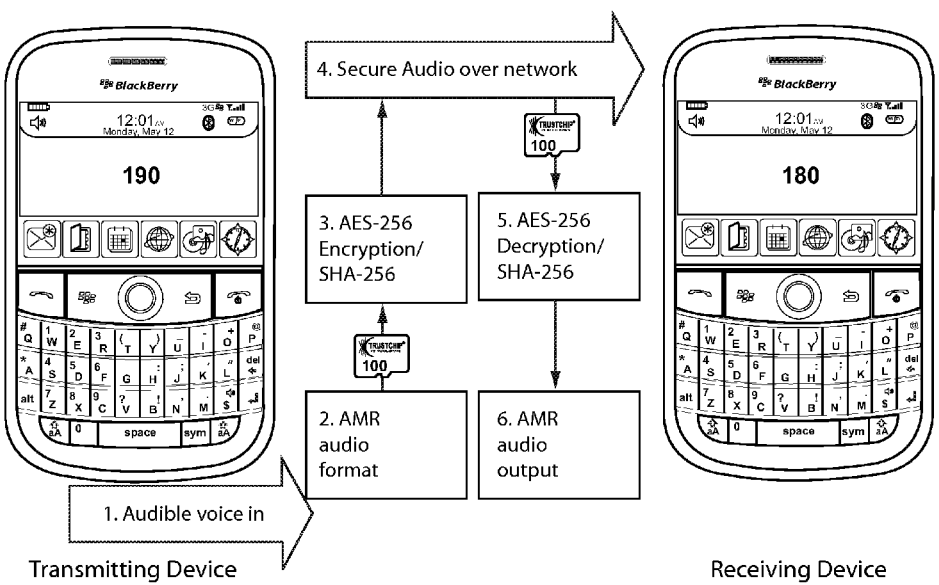
FIG. 2 is a diagram illustrating a high-level diagram of encrypted audio transmission in a single direction (Handset 1→Handset 2) of the encrypted voice process of the present invention.

FIG. 2 is a diagram illustrating a more detailed view of the encrypted voice process of the present invention, once a call is initiated. As illustrated in FIG. 2, device 190 may initiate a call to device 180. Both devices 180,190 may comprise, for example, a Blackberry 9000 digital PDA/cellphone device as known in the art. Devices 180,190 may be equipped with an encryption device, such as the KoolSpan chip 100 of FIGS. 1 and 8. In step 1, of FIG. 2, the microphone on device 190 may pick up a voice signal from the user. The user talks into the device as they would in an ordinary cell phone call. The captured voice signal in AMR (adaptive Multi-Rate) audio format is then converted, in step 2, into an AMR in one of the two media players running on device 190. Other audio file formats may be used within the spirit and scope of the present invention. In step 3, the AMR audio is encrypted using AES-256 encryption (Advanced Encryption Standard) as provided by the KoolSpan TrustChip 100. In the present invention, the encryption used is the BlackBerry implementation of AES-256 as utilized by the TrustChip Library to provide unique per-packet encryption and hashing. Again, other types of encryption may be utilized without departing from the spirit and scope of the present invention. The KoolSpan device was selected as an Off-The-Shelf (OTS) solution.

In step 4, the encrypted audio data is then sent over the network through one or more channels. The Blackberry device may communicate through the Internet via WiFi, BlueTooth, or via cellular modem, broadband, or the like, in a manner transparent to the user. The audio data, however, is transmitted as Internet data, not as a traditional telephone call. The receiving device 180 then receives this encrypted audio data and decrypts it in step 5, using the same type of KoolSpan chip 100. In step 6, a media player in the receiving device 180 decodes the AMR audio into analog voice signals, which are then played through the earpiece (or speakerphone speaker) of the receiving device 180. The listener hears the voice as they would through an ordinary cellular phone call, but in fact is not making a cell phone call, but hearing an audio file playback through their device as they would an MP3 music file or the like.

The method illustrated in FIG. 2 shows the process from a transmitting device 190 (where a user is talking) to a receiving device 180 (where a user is listening). The process, of course, is bi-directional. In order to enable bi-directional communication, each device 180,190 may be running two media players (e.g., AMR Audio Codecs) simultaneously. The present invention takes advantage of the Blackberry's capability to run two such audio codecs simultaneously in order to process voice calls as audio data. Other devices could be similarly adapted, provided they are capable of (or were made capable of) running multiple audio codecs simultaneously. Thus, while the present invention is illustrated as being used with a Blackberry 9000 in the preferred embodiment, other devices may be used within the spirit and scope of the present invention, provided they are capable of running dual codecs, or a single bi-directional codec.

Figure 3:
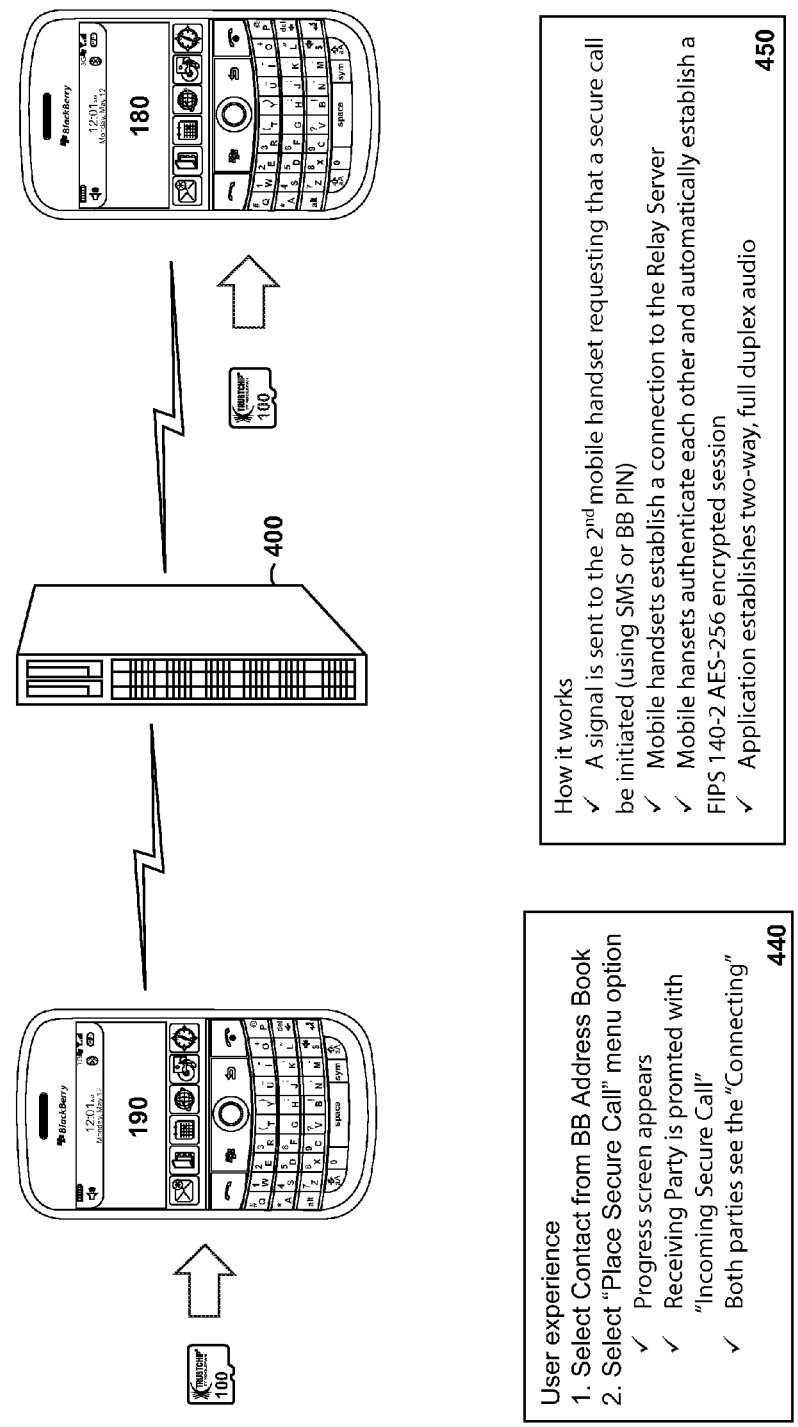
FIG. 3 is a diagram illustrating a high-level flow diagram of the relay server 400 of FIG. 1.

FIG. 3 is a diagram illustrating details of the relay server 400 in FIG. 1. Referring again to FIG. 1 and to FIG. 3, device 190 may initiate a call to device 180. Relay server 400 may be used to authenticate users to the server. The user is connected through the relay server 400 only when a call is made, thus saving battery power on the user's phone 190 when not in use. Once the One Vault Voice software is installed, a user can place a call through the relay server by selecting a contact from their address book as shown in block 440. The user then selects "Place Secure Call" from the menu options. As a result, call initiation begins and a progress screen is displayed to indicate the status of the call being made.

The receiving party will then see a message "Incoming Secure Call" on their device 180. If the receiving party accepts the call, both parties will see a series of phrases indicating the status of the connection ("Outgoing/Answering", "Authenticating", "Connected") on their devices 180, 190. As illustrated in block 450, a signal is first sent from handset 190 requesting that a secure call be initiated. This message may be sent by SMS, a Blackberry PIN message, or other mechanism. The mobile handsets 180,190 then establish a connection through the relay server 400. The mobile handsets then negotiate encryption and automatically establish a FIPS 140-2 AES-256 encrypted session, using the KoolSpan encryption devices 100 or equivalent. The One Voice Vault software then establishes a two-way, full-duplex audio connection as discussed previously.

Referring back to FIG. 1, when using relay server 400, secure voice relay 420 may determine whether devices 180, 190 are authorized to make secure calls, by requiring two-way authentication (handset to relay server and relay server to handset) from each device. Authentication information may be stored in a relay user database 410. Relay user database 410 may be updated through user management agent 430 which may interface to KOOLSPAN TrustCenter 500 as will be discussed below in more detail.

Figure 4:
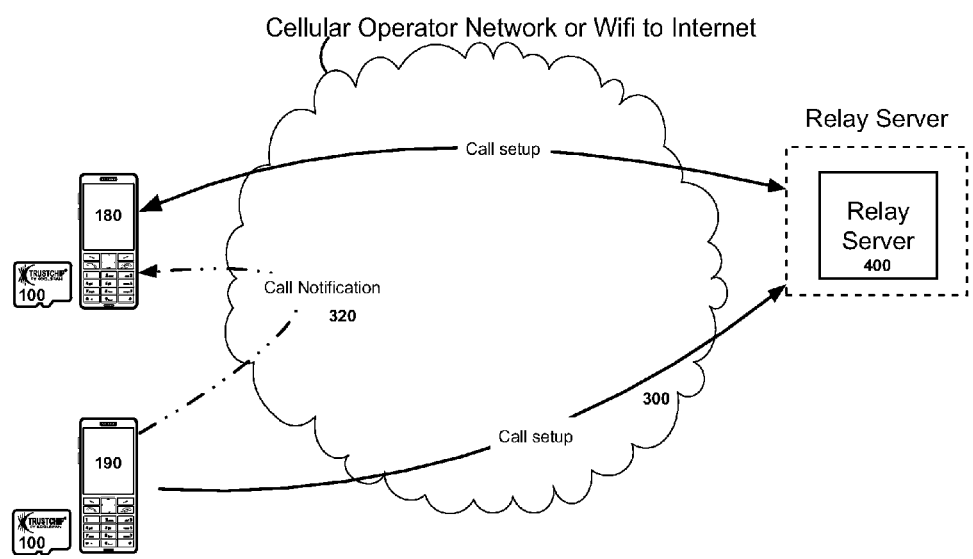
FIG. 4 is a diagram illustrating the call setup and notification procedure over SMS or BB PIN.

FIG. 4 is a diagram illustrating the call setup and notification procedure over SMS or BB PIN. Referring to FIGS. 1 and 4, device 190 may initiate a call setup through Relay Server 400 through network 300. Network 300 may comprise the Internet, as accessed through WiFi, Cellular modem, cellular broadband, Bluetooth, or other connection between devices 180,190 and the Internet. As shown in FIG. 4, call setup communications may be sent from device 190 through relay server 400. Relay server may authenticate device 190. A call notification may be sent directly from device 190 to device 180 through network 400 as illustrated in FIG. 4. Device 180 may interface with relay server 400 through network 300 to authenticate that the incoming call is from an authenticated device, as well as to confirm authentication of itself.

In the preferred embodiment, device 190 logs into the relay server, obtains a unique session ID. Device 190 sends that session ID to Device 180 along with the relay server ID and other call data (timeout information, etc.) via an SMS, PIN or other method. If device 180 chooses to answer the call, it logs into the relay server 400, and obtains its own unique session id. Device 180 sends its session ID to device 190 via Relay server 400. Device 180 addresses all communication through the relay server to device 190 via the session ID it received in the initial message. Relay server 400 routes data to devices 180, 190 via the session IDs. Relay server 400 also provides logging and monitoring capabilities for service providers.

Figure 5:
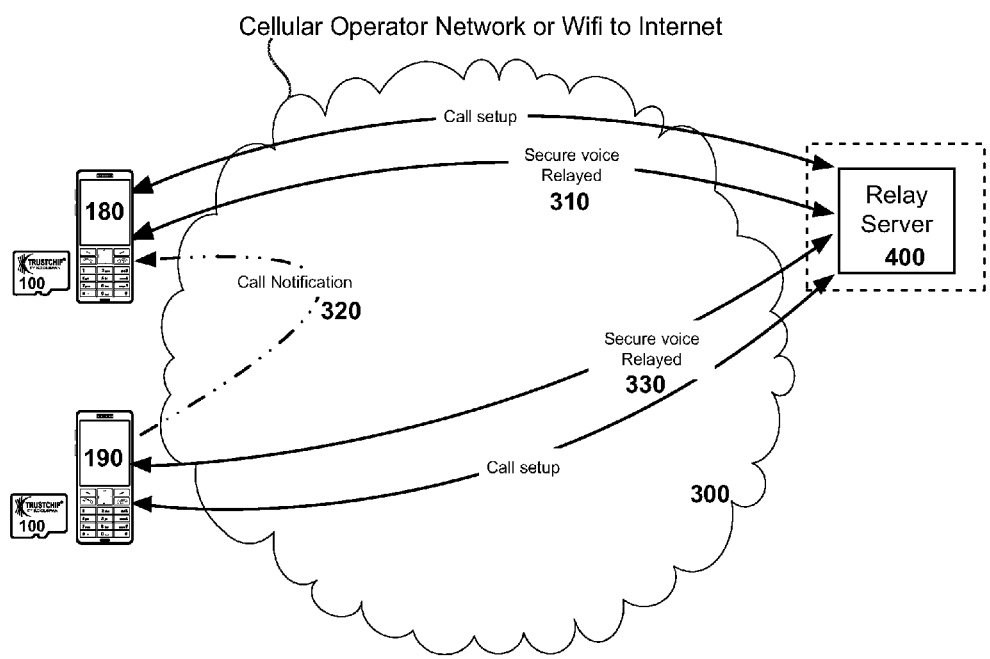
FIG. 5 is a diagram illustrating the call setup and notification protocol through the secure voice relay.

FIG. 5 is a diagram illustrating the call setup and notification protocol through the secure voice relay. Once the call is established, as shown in FIG. 4, the secure voice data may be relayed through relay server 400 through network 300. Secured voice data 300 may comprise encrypted voice data sent as media data packets, as previously discussed. Note that alternately, data may be send directly between devices 180, 190 in an alternative embodiment, eliminating the need for relay server 400. However, in such an embodiment, devices 180,190 must have alternate means to authenticate each other.

Figure 6:
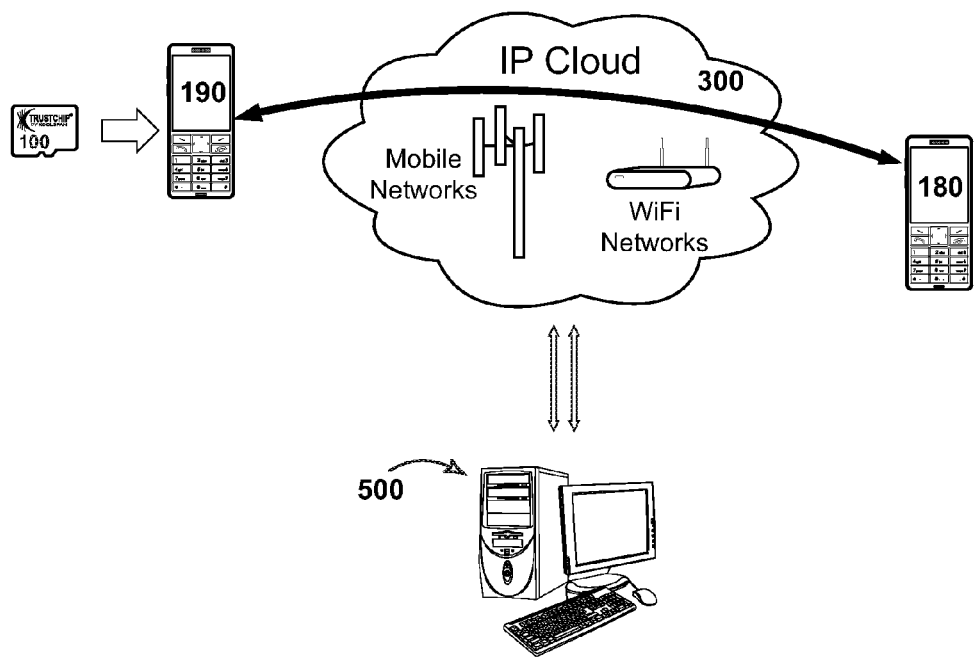
FIG. 6 is a diagram illustrating an overview of the trust chip solution of the Prior Art as used as a component of the present invention.

FIG. 6 is a diagram illustrating an overview of the Kool-Span trust chip solution of the Prior Art as used as a component of the present invention. Again, the use of the KoolSpan Trust Chip is merely an Off-The-Shelf (OTS) solution for the encryption portion of the present invention, and other types of encryption systems may be used without departing from the spirit and scope of the present invention. The KoolSpan Trust-Chip is the best mode contemplated at the time of filing the present application. Referring to FIGS. 1 and 6, the trust center 500 (which may include physically, relay center 400) may be hosted externally or internally deployed, for example, within an organization. TrustCenter 500 may include a database 510 of user identification information (name, phone number, and the like) along with corresponding serial number information for the TrustChip assigned to that individual. TrustCenter 500 may be used to administer TrustCenter database 510 through administrative services 550 and the Trust-Center Administrator console 560. The administrator may enable or disable TrustChips, upload data to relay server database 410 through OneVault management Gateway 520, monitor transactions via transaction service 540, or even disable (including destructive disabling) lost or stolen or deactivated TrustChips 100 through TrustChip Gateweay 530.

As illustrated in block 570, the administrator may assign a user to a TrustGroup. Examples of TrustGroups will be described in more detail below. Transaction service 540 may be used to send SMS messages to an individual phone 180, 190 notifying the user of available updates and the like. The TrustChip connector on the users phone 180,190 may then contact the TrustChip gateway 530 and download TrustChip updates as necessary. Updates may then be applied to a Trust-Chip 100 and the TrustChip gateway 530 notified. In this manner, TrustChip software may be upgraded and updated.

In the preferred embodiment of the present invention, using KoolSpan TrustChip encryption technology, Trust Groups may be employed as part of the authentication process. One Vault Voice verifies that both the calling and receiving devices are members of the same KoolSpan "TrustGroup." A Trust-Group is a security association that implies trust amongst its members. All TrustGroups to which a mobile device user belongs are on the TrustChip inserted into the user's handset. By default, all TrustChips include a "Universal" TrustGroup allowing for secure peer-to-peer communication amongst One Vault Voice users. Universal TrustGroup exists on all activated TrustChips. It is one example of a TrustGroup, but it may not specifically allow for secure peer to peer. In peer-to-peer One Vault Voice-enabled device communities, Trust-Groups do not require any administration. However, an organization may have elected to centrally manage TrustGroup security associations and TrustChip processors using the KoolSpan TrustCenter™ security management framework. TrustChip and TrustGroups and TrustCenter are provided as part of the KoolSpan TrustChip encryption technology and do not form part of this invention except as employed as an Off-The-Shelf (OTS) encryption technique. Other types of encryption technologies may be employed within the spirit and scope of the present invention. The disclosure of the KoolSpan technology in the present application is provided to comply with the "best mode" requirement, illustrating the best mode contemplated at the time of filing of the present application.

While establishing a secure call, One Vault Voice verifies that both the calling and receiving devices are members of the same "TrustGroup." A TrustGroup is a security association that implies trust amongst its members. All TrustGroups to which a mobile device user belongs are on the TrustChip inserted into the user's handset. By default, all TrustChips include a "Universal" TrustGroup allowing for secure peer-to-peer communication amongst One Vault Voice users, even those outside your organization. This Universal TrustGroup may be disabled, depending on your organization's security policy. In the peer-to-peer implementation, all the necessary authentication keys are pre-loaded onto the KoolSpan Trust-Chip.

When the TrustChip is inserted into a mobile device and the One Vault Voice software is installed, the device can connect securely to other TrustChip-enabled devices. From that point on, mobile devices authenticate sessions and set up secure end-to-end tunnels automatically. In peer-to-peer One Vault Voice-enabled device communities, TrustGroups do not require any administration. However, an organization may have elected to centrally manage TrustGroup security associations and TrustChip processors by implementing the Kool-Span TrustCenter security management solution.

With TrustCenter, administrators are given the ability to dynamically create TrustGroups and permit/deny security associations for the enterprise users and their mobile devices. The TrustChip Connector is the component that allows for the remote management of TrustChips. The TrustCenter used herein may comprise the KoolSpan TrustCenter used to manage TrustChips, TrustGroups, users and their associated devices.

The TrustChip Connector is an application that allows for the remote management of TrustChips via the KoolSpan TrustCenter security management software. The TrustCenter Connector is installed on the mobile device and acts as a secure conduit between the TrustCenter administrative services and the remote TrustChips. It is important to note that if TrustChips are not managed by a TrustCenter, then the Trust-Chip Connector may not appear on the mobile device.

As illustrated in FIGS. 1-9 discussed above, One Vault™ Voice provides a secure mobile voice solution that ensures end-to-end voice traffic confidentiality and integrity. The One Vault Voice software is installed on every mobile device that will be initiating or receiving secure calls. Each device also contains a KoolSpan® TrustChip® security processor. Trust-Chips are the physical cryptographic devices housed within a microSD memory card that provide the means to authenticate and secure communication between two entities. When a One Vault Voice-enabled phone calls another such phone, the devices transparently authenticate and connect. All voice communication is then encrypted and sent over a secure data channel. The entire process is seamless to the mobile device users. One Vault Voice currently functions on the RIM BlackBerry platform.

The system of the present invention may be installed on a Blackberry type cellphone/PDA (e.g., Blackberry 9000). Prior to installing the One Vault Voice system, the user should verify they have a KoolSpan TrustChip security processor v1.1 or higher (this is a special microSD memory card). Accompanying the TrustChip, the user is provided with a One Vault Voice for BlackBerry installation file. However, in some instances the installation file may be sent to the user electronically. If so, the user need only verify that they have received the latest release, prior to installation. The application may also be installed to the device directly through the device browser. The One Vault Voice for BlackBerry software may also be installed to a phone over the Internet.

The user then confirms that they have a supported phone/device (including firmware requirements). The phone being used should have a SIM card with an active unlimited Blackberry data plan (allowing full email, web browsing, and other data access). In addition, the phone should be capable of SMS/text messages (it is recommended that an unlimited SMS plan is also acquired)—this is generally a 'contract' and not 'pre-paid' (SIM) account.

While disclosed herein as applied to the Blackberry™ type of smartphone, the present invention may be applied to other types smartphone platforms including but not limited to iPhone or iPad iOS, Android, Windows 7 Mobile, or the like, as well as other types of communications devices. The disclosure herein of the Blackberry™ embodiment is provided to show best mode contemplated at the time of filing, as well as to allow one of ordinary skill in the art to understand the invention. However, the disclosure of the best mode should not be construed as limiting the scope of the invention in any way.

Similarly, in the preferred embodiment and best mode contemplated at the time of filing, a removable Trustchip is provided to provide encryption keys. However, the use of the Trustchip is by way of example only, and other types or removable devices may also be used, including but not limited to, a CAC card, Military ID card smart chip, DoD encryption certificates, or the like. Alternately, the keys and encryption technology may be embedded in software of the device itself, or provided in firmware, hardware, or the like.

An alternative embodiment of the present invention, known as One Vault Messenger, delivers SMS Encryption for safe and secure text messaging via BlackBerry and other types of smartphones. Short Message Service (SMS) communication is an effective method to quickly relay critical or sensitive information in a brief, succinct text message. This invaluable form of communication can positively impact the daily operations of all market segments (commercial, military and public safety). The challenge is that while SMS security is adequate for most open communications, it does not provide secure transmission for Controlled Unclassified Information (CUI) level messages. SMS security is limited to the cellular networks that it travels across: Global System for Mobile Communications (GSM) or Code Division Multiple Access (CDMA). Both offer limited security protection to adequately prevent information from being exposed. As the mobile workforce expands at an unprecedented rate, so too does their reliance on smartphones to stay connected and productive. To ensure the safety of their SMS communications, enterprises must make mobile security requirements a top priority.

In an alternative embodiment of the One Vault mobile security solutions, a system for protecting text messaging, One Vault Messenger (OVM) is provided, in a preferred embodiment, for BlackBerry smartphones. OVM encrypts and decrypts SMS text messages across GSM and CDMA networks. OVM combines an easy-to-use BlackBerry application with a tamper-resistant microSD encryption card that can be remotely managed. The end result is a powerful encryption solution for CUI SMS transmissions.

Whether sending or receiving the message, OVM provides security strength and operational flexibility anywhere that mobile service is offered, assuring end-to-end security from the originating BlackBerry, through the network, to the destination device—regardless of any vulnerability in the underlying networks. OVM also provides delivery notification of SMS texts as well as notification whether or not a message has been viewed by the recipient for added convenience and reassurance.

OVM delivers an intuitive user interface with advanced application features and the industry strength of KoolSpan's TrustChip encryption solution. This hardware anchored solution transforms smartphones and networks into a secure communications infrastructure for SMS communications.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A computer-implemented method for establishing secure voice communications between a first communication device and a second communication device over a cellular network, comprising:
   contacting, by the first communication device, a relay server to initiate a secure voice communication;
   receiving, from the relay server, a unique session identification (ID);
   transmitting a call notification from the first communication device to the second communication device, wherein the call notification includes the unique session ID;
   negotiating encryption between the first communication device and the second communication device;
   establishing an encrypted session between the first communication device and the second communication device, wherein the encrypted session is associated with the unique session ID;
   receiving, by the first communication device, a first voice signal from a microphone communicatively coupled to the first communication device,
   receiving, by a first media player in the first communication device, the first voice signal from the microphone;
   converting, by the first media player, the first voice signal into a first digital audio data, wherein the first digital audio data comprises a media player data format;
   encrypting the first digital audio data based on an encryption application executing on the first communication device to obtain first encrypted Internet Protocol (IP) packets;
   transmitting the first encrypted IP packets over the cellular network to the second communication device;
   receiving, at the first communication device, second encrypted IP packets from the second communication device over the cellular network;
   decrypting the second encrypted IP packets in a decryption application executing on the first communication device to obtain a second digital audio data;

outputting the second digital audio data to a second media player in the first communication device;

converting, by the second media player, the second digital audio data into a second voice signal; and outputting, from a speaker coupled to the first communication device, the second voice signal, wherein the first media player and the second media player operate simultaneously.

2. The method of claim 1, wherein the transmitting the first encrypted IP packets over the cellular network includes:

analyzing performance metrics data including delivery frequency and buffer acclamation;

adjusting data package sizes based on the analyzed performance metrics data to obtain performance dependent variable packet sizes; and outputting the first encrypted IP packets based on the performance dependent variable packet sizes.

3. The method of claim 1, wherein the first digital audio data is encrypted in the first communication device using a removable device coupled to the first communication device.

4. The method of claim 1, wherein the first encrypted IP packets comprise User Datagram Protocol (UDP) IP packets.

5. The method of claim 1, wherein the second digital audio data is decrypted by the first communication device using a removable device coupled to the first communication device.

6. The method of claim 1, wherein the second encrypted IP packets comprise User Datagram Protocol (UDP) IP packets.

7. The method device of claim 1, wherein receiving, at the first communication device, second encrypted IP packets from the second communication device comprises:

buffering, in a media player buffer of the first communication device, data received by at least the second media player, the media player buffer configured to limit the amount of data buffered by the at least the second media player.

8. The method of claim 7, wherein the buffering the data includes:

limiting, by the media player buffer, initial playback delay.

9. The method of claim 7, wherein the buffering the data includes:

optimizing packet and audio buffering to smooth the second voice signal when encountering network and device resource inconsistencies.

10. The method of claim 7, wherein the buffering the data includes:

dropping intermittent portions of the second digital audio data to obtain data thinning when an amount of accumulated data that is accumulated by the media player buffer exceeds a predetermined threshold.

11. The method of claim 10, wherein the predetermined threshold comprises multiple predetermined thresholds defined such that an amount of data thinning associated with each of the multiple predetermined thresholds is different.

12. A communication device for transmitting and receiving secure voice communications over a cellular network, the communication device comprising:

a transceiver configured to contact a relay server to initiate a secure voice communication, receive a unique session identification (ID) from the relay server, transmit a call notification that includes the unique session ID from the communication device to another communication device;

an encryption/decryption device comprising a security processor, configured to negotiate encryption between the communication device and the another communication device, and establish an encrypted session between the communication device and the another communication device, wherein the encrypted session is associated with the unique session ID;

a microphone communicatively coupled to the communication device and configured to receiving a first voice signal and send the first voice signal;

a first media player configured to receive the first voice signal from the microphone, convert the first voice signal into a first digital audio data, wherein the first digital audio data comprises a media player data format;

wherein the encryption/decryption device comprising the security processor is further configured to encrypt the first digital audio data based on an encryption application executing on the communication device to obtain first encrypted Internet Protocol (IP) packets;

wherein the transceiver is further configured to transmit the first encrypted IP packets over the cellular network to the another communication device and receive second encrypted IP packets from the another communication device over the cellular network;

wherein the encryption/decryption device comprising the security processor is further configured to decrypt the second encrypted IP packets based on a decryption application executing on the communication device to obtain a second digital audio data and output the second digital audio data;

wherein the communication device further comprises:

a second media player configured to receive the second digital audio data output by the encryption/decryption unit, convert the second digital audio data into a second voice signal, and output the second voice signal; and a speaker configured to receive the second voice signal output by the second media player, and audibly output the second voice signal;

wherein the first media player and the second media player operate simultaneously.

13. The communication device of claim 12, wherein when the transceiver is configured to transmit the first encrypted IP packets over the cellular network, the transceiver is further configured to:

analyze performance metrics data including delivery frequency and buffer acclamation, adjust data package sizes based on the analyzed performance metrics data to obtain performance dependent variable packet sizes, and output the first encrypted IP packets based on the performance dependent variable packet sizes.

14. The communication device of claim 12, wherein the first digital audio data is encrypted in the communication device using a removable device coupled to the communication device.

15. The communication device of claim 12, wherein the first encrypted IP packets comprise User Datagram Protocol (UDP) IP packets.

16. The communication device of claim 12, wherein the encryption/decryption device is a removable device coupled to the first communication device.

17. The communication device of claim 12, wherein the second encrypted IP packets comprise User Datagram Protocol (UDP) IP packets.

18. The communication device of claim 12, further including:

a media player buffer communicatively coupled to the second media player and configured to limit an amount of data buffered by the second media player.

19. The communication device of claim 18, wherein when the media player buffer is configured to limit the amount of data buffered by the second media player, the media player buffer is further configured to:
limit initial playback delay.

20. The communication device of claim 18, wherein when the media player buffer is configured to limit the amount of data buffered by the second media player, the media player buffer is further configured to:
optimize packet and audio buffering to smooth the second voice signal when encountering network and device resource inconsistencies.

21. The communication device of claim 18, wherein when the media player buffer is configured to limit the amount of data buffered by the second media player, the media player buffer is further configured to:
drop intermittent portions of the second digital audio data to obtain data thinning when an amount of accumulated data that is accumulated by the media player buffer exceeds a predetermined threshold.

22. The communication device of claim 21, wherein the predetermined threshold comprises multiple predetermined thresholds defined such that an amount of data thinning associated with each of the multiple predetermined thresholds is different.

23. A system for transmitting and receiving encrypted voice communications signals over a cellular network, the system comprising:
at least two communication devices, each of the at least two communication devices having at least two media players,
a cellular network for wireless communication of digital data between the at least two communication devices;
wherein each of the at least two communication devices comprise a transceiver configured to communicate with a relay server to initiate a secure voice communication, receive a unique session identification (ID) from the relay server, transmit a call notification from one of the at least two communication devices to another of the at least two communication devices, wherein the call notification includes the unique session ID,
wherein each of the at least two communication devices further comprise a respective security processor configured to negotiate encryption between the one of the at least two communication devices and the another of the at least two communication devices, and establish an encrypted session between the one of the at least two communication devices and the another of the at least two communication devices, wherein the encrypted session is associated with the unique session ID,
wherein the transceiver of each of the at least two communication devices is further configured to:
receive a first voice signal from a microphone coupled to a respective one of the at least two communication devices,
receive the first voice signal in a first media player of the at least two media players in the respective one of the at least two communication devices, and convert, by the first media player, the first voice signal into a first digital audio data, wherein the first digital audio data comprises a media player data format;
wherein the respective security processor of each of the at least two communication devices is further configured to encrypt the first digital audio data in an encryption application running on the respective one of the at least two communication devices;
wherein the transceiver of each of the at least two communication devices is further configured to output the encrypted first digital data as first encrypted Internet Protocol (IP) packets over the cellular network to the another of the at least two communication devices; and
wherein each of the at least two communication devices is further configured to:
receive, over the cellular network, a second encrypted IP packet from the another of the at least two communication devices,
decrypt the second encrypted IP packet in a decryption application running on the security processor of a respective one of the at least two communication devices,
output decrypted second digital audio data,
receive, in a second media player of the at least two media players in the respective one of the at least two communication devices, the decrypted second digital audio data,
convert, by the second media player, the decrypted second digital audio data into a second voice signal, and
output, from a speaker coupled to the respective one of the at least two communication devices, the second voice signal;
wherein the first and the second media players in the respective one of the at least two communication devices operate simultaneously.

\* \* \* \* \*